US009860710B2

(12) United States Patent
Buttolo et al.

(10) Patent No.: US 9,860,710 B2
(45) Date of Patent: Jan. 2, 2018

(54) SYMMETRICAL REFERENCE PERSONAL DEVICE LOCATION TRACKING

(71) Applicant: Ford Global Technologies, LLC, Dearborn, MI (US)

(72) Inventors: Pietro Buttolo, Dearborn Heights, MI (US); Stephen Ronald Tokish, Sylvania, OH (US); James Stewart Rankin, II, Novi, MI (US); Stuart C. Salter, White Lake, MI (US); Gary Steven Strumolo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/847,498

(22) Filed: Sep. 8, 2015

(65) Prior Publication Data
US 2017/0070862 A1     Mar. 9, 2017

(51) Int. Cl.
*H04W 4/04*     (2009.01)
*G08G 1/127*     (2006.01)
*G08B 21/22*     (2006.01)

(52) U.S. Cl.
CPC ............. *H04W 4/046* (2013.01); *G08B 21/22* (2013.01); *G08G 1/127* (2013.01)

(58) Field of Classification Search
CPC ........ G08G 1/127; G08B 21/22; G08B 21/24; G08B 21/0247; G01S 5/00; G01S 5/0294;
(Continued)

(56) References Cited

U.S. PATENT DOCUMENTS

| 4,721,954 A | 1/1988 | Mauch |
| 4,792,783 A | 12/1988 | Burgess et al. |

(Continued)

FOREIGN PATENT DOCUMENTS

| CN | 102445954 B | 3/2014 |
| CN | 103942963 A | 7/2014 |

(Continued)

OTHER PUBLICATIONS

Rasin, "An In-Vehicle Human-Machine Interface Module," XML Journal, Jan. 3, 2003, (9 pages), retrieved from http://xml.sys-con.com/node/40547 on Dec. 13, 2014.
(Continued)

*Primary Examiner* — Nizar Sivji
(74) *Attorney, Agent, or Firm* — Jennifer M. Stec; Brooks Kushman P.C.

(57) ABSTRACT

A system may include in-vehicle components arranged symmetrically within and delimiting boundaries of a vehicle interior; and a processor programmed to identify signal strength information indicative of distance of a personal device from wireless transceivers of each of the in-vehicle components; and compute, using the signal strength information, a quadrant and diagonal sector including a location of the personal device, and whether the location is within the vehicle interior. A method may include identifying a quadrant of a vehicle including a location of a personal device by comparing signal strength information of pairs of wireless transceivers in adjacent quadrants to signal strength information of wireless transceivers opposite the pairs; and determining a diagonal sector including the location by comparing the signal strength information from the wireless transceiver of the quadrant to the signal strength information from the wireless transceiver in a diagonally-opposite quadrant.

15 Claims, 11 Drawing Sheets

(58) Field of Classification Search
CPC ... H04M 1/6091; H04W 48/02; H04W 84/18; H04W 48/08; H04W 64/00; H04B 7/00
See application file for complete search history.

(56) References Cited

U.S. PATENT DOCUMENTS

| | | | |
|---|---|---|---|
| 4,962,302 A | 10/1990 | Katsumi | |
| 5,132,880 A | 7/1992 | Kawamura | |
| 5,143,437 A | 9/1992 | Matsuno et al. | |
| 5,543,591 A | 8/1996 | Gillespie et al. | |
| 5,648,656 A | 7/1997 | Begemann et al. | |
| 5,650,929 A | 7/1997 | Potter et al. | |
| 5,697,844 A | 12/1997 | Von Kohorn | |
| 5,757,268 A | 5/1998 | Toffolo et al. | |
| 5,796,179 A | 8/1998 | Honaga | |
| 5,848,634 A | 12/1998 | Will et al. | |
| 5,850,174 A | 12/1998 | DiCroce et al. | |
| 6,028,537 A | 2/2000 | Suman et al. | |
| 6,377,860 B1 | 4/2002 | Gray et al. | |
| 6,397,249 B1 | 5/2002 | Cromer et al. | |
| 6,449,541 B1 | 9/2002 | Goldberg et al. | |
| 6,473,038 B2 | 10/2002 | Patwari et al. | |
| 6,536,928 B1 | 3/2003 | Hein et al. | |
| 6,935,763 B2 | 8/2005 | Mueller et al. | |
| 7,009,504 B1 | 3/2006 | Banter et al. | |
| 7,015,791 B2 | 3/2006 | Huntzicker | |
| 7,015,896 B2 | 3/2006 | Levy et al. | |
| 7,034,655 B2 | 4/2006 | Magner et al. | |
| 7,342,325 B2 | 3/2008 | Rhodes | |
| 7,502,620 B2 | 3/2009 | Morgan et al. | |
| 7,595,718 B2 | 9/2009 | Chen | |
| 7,672,757 B2 | 3/2010 | Hong et al. | |
| 7,706,740 B2 | 4/2010 | Collins et al. | |
| 7,778,651 B2 | 8/2010 | Billhartz | |
| 7,800,483 B2 | 9/2010 | Bucher | |
| 7,810,969 B2 | 10/2010 | Blackmore et al. | |
| 7,973,773 B2 | 7/2011 | Pryor | |
| 8,065,169 B1 | 11/2011 | Oldham et al. | |
| 8,073,589 B2 | 12/2011 | Rasin et al. | |
| 8,324,910 B2 | 12/2012 | Lamborghini et al. | |
| 8,344,850 B2 | 1/2013 | Girard, III et al. | |
| 8,408,766 B2 | 4/2013 | Wilson et al. | |
| 8,417,258 B2 | 4/2013 | Barnes, Jr. | |
| 8,421,589 B2 | 4/2013 | Sultan et al. | |
| 8,447,598 B2 | 5/2013 | Chutorash et al. | |
| 8,476,832 B2 | 7/2013 | Prodin et al. | |
| 8,482,430 B2 | 7/2013 | Szczerba | |
| 8,768,565 B2 | 7/2014 | Jefferies et al. | |
| 8,797,295 B2 | 8/2014 | Bernstein et al. | |
| 8,823,517 B2 * | 9/2014 | Hadsall, Sr. | G08B 21/22 235/375 |
| 8,831,514 B2 | 9/2014 | Tysowski | |
| 8,856,543 B2 | 10/2014 | Geiger et al. | |
| 8,866,604 B2 | 10/2014 | Rankin et al. | |
| 8,873,147 B1 | 10/2014 | Rhodes et al. | |
| 8,873,841 B2 | 10/2014 | Yang et al. | |
| 8,880,100 B2 | 11/2014 | Dobyns | |
| 8,930,045 B2 | 1/2015 | Oman et al. | |
| 8,947,202 B2 | 2/2015 | Tucker et al. | |
| 9,053,516 B2 | 6/2015 | Stempora | |
| 9,078,200 B2 | 7/2015 | Wuergler et al. | |
| 9,350,809 B2 | 5/2016 | Leppanen | |
| 9,417,691 B2 | 8/2016 | Belimpasakis et al. | |
| 2002/0069002 A1 | 6/2002 | Morehouse | |
| 2002/0070923 A1 | 6/2002 | Levy et al. | |
| 2002/0087423 A1 | 7/2002 | Carbrey Palango et al. | |
| 2002/0092019 A1 | 7/2002 | Marcus | |
| 2002/0096572 A1 | 7/2002 | Chene et al. | |
| 2002/0178385 A1 | 11/2002 | Dent et al. | |
| 2002/0197976 A1 | 12/2002 | Liu et al. | |
| 2003/0078709 A1 | 4/2003 | Yester et al. | |
| 2003/0171863 A1 | 9/2003 | Plumeier et al. | |
| 2004/0034455 A1 | 2/2004 | Simonds et al. | |
| 2004/0076015 A1 | 4/2004 | Aoki et al. | |
| 2004/0215532 A1 | 10/2004 | Boman et al. | |
| 2005/0040933 A1 | 2/2005 | Huntzicker | |
| 2005/0044906 A1 | 3/2005 | Spielman | |
| 2005/0099320 A1 | 5/2005 | Nath et al. | |
| 2005/0136845 A1 * | 6/2005 | Masuoka | G01S 5/0294 455/67.14 |
| 2005/0185399 A1 | 8/2005 | Beermann et al. | |
| 2005/0261807 A1 | 11/2005 | Sorensen et al. | |
| 2005/0261815 A1 | 11/2005 | Cowelchuk et al. | |
| 2005/0288837 A1 | 12/2005 | Wiegand et al. | |
| 2006/0075934 A1 | 4/2006 | Ram | |
| 2006/0089755 A1 | 4/2006 | Ampunan et al. | |
| 2006/0155429 A1 | 7/2006 | Boone et al. | |
| 2006/0155547 A1 | 7/2006 | Browne et al. | |
| 2006/0205456 A1 | 9/2006 | Bentz et al. | |
| 2006/0250217 A1 | 11/2006 | Hamling et al. | |
| 2006/0258377 A1 | 11/2006 | Economos et al. | |
| 2006/0271261 A1 | 11/2006 | Flores et al. | |
| 2007/0021885 A1 | 1/2007 | Soehren | |
| 2007/0140187 A1 | 6/2007 | Rokusek et al. | |
| 2007/0180503 A1 | 8/2007 | Li et al. | |
| 2007/0198472 A1 | 8/2007 | Simonds et al. | |
| 2007/0201389 A1 | 8/2007 | Murayama | |
| 2007/0262140 A1 | 11/2007 | Long, Sr. | |
| 2008/0140868 A1 | 6/2008 | Kalayjian et al. | |
| 2008/0180231 A1 | 7/2008 | Chen | |
| 2008/0261643 A1 | 10/2008 | Bauer et al. | |
| 2008/0288406 A1 | 11/2008 | Seguin et al. | |
| 2009/0249081 A1 | 10/2009 | Zayas | |
| 2009/0253439 A1 | 10/2009 | Gantner et al. | |
| 2010/0091394 A1 | 4/2010 | DeWind et al. | |
| 2010/0176917 A1 | 7/2010 | Bacarella | |
| 2010/0197359 A1 | 8/2010 | Harris | |
| 2010/0216401 A1 * | 8/2010 | Kitahara | H04M 1/6091 455/41.2 |
| 2010/0222939 A1 | 9/2010 | Namburu et al. | |
| 2010/0225443 A1 | 9/2010 | Bayram et al. | |
| 2010/0231958 A1 | 9/2010 | Okigami | |
| 2010/0233957 A1 | 9/2010 | Dobosz | |
| 2010/0280711 A1 | 11/2010 | Chen et al. | |
| 2010/0315373 A1 | 12/2010 | Steinhauser et al. | |
| 2011/0086668 A1 | 4/2011 | Patel | |
| 2011/0137520 A1 | 6/2011 | Rector et al. | |
| 2011/0187496 A1 | 8/2011 | Denison et al. | |
| 2011/0199298 A1 | 8/2011 | Bassompiere et al. | |
| 2011/0219080 A1 | 9/2011 | McWithey et al. | |
| 2012/0006611 A1 | 1/2012 | Wallace et al. | |
| 2012/0065815 A1 | 3/2012 | Hess | |
| 2012/0096908 A1 | 4/2012 | Fuse | |
| 2012/0098768 A1 | 4/2012 | Bendewald et al. | |
| 2012/0109451 A1 | 5/2012 | Tan | |
| 2012/0136802 A1 | 5/2012 | McQuade et al. | |
| 2012/0154114 A1 | 6/2012 | Kawamura | |
| 2012/0214463 A1 * | 8/2012 | Smith | H04M 1/72577 455/418 |
| 2012/0214471 A1 | 8/2012 | Tadayon et al. | |
| 2012/0229253 A1 | 9/2012 | Kolar | |
| 2012/0244883 A1 | 9/2012 | Tibbitts et al. | |
| 2012/0254809 A1 | 10/2012 | Yang et al. | |
| 2012/0268235 A1 | 10/2012 | Farhan et al. | |
| 2012/0268242 A1 | 10/2012 | Tieman et al. | |
| 2013/0015951 A1 | 1/2013 | Kuramochi et al. | |
| 2013/0037252 A1 | 2/2013 | Major et al. | |
| 2013/0079951 A1 | 3/2013 | Brickman | |
| 2013/0099892 A1 | 4/2013 | Tucker et al. | |
| 2013/0116012 A1 | 5/2013 | Okayasu | |
| 2013/0218371 A1 | 8/2013 | Simard et al. | |
| 2013/0227647 A1 | 8/2013 | Thomas et al. | |
| 2013/0259232 A1 | 10/2013 | Petel | |
| 2013/0295908 A1 | 11/2013 | Zeinstra et al. | |
| 2013/0300608 A1 | 11/2013 | Margalef et al. | |
| 2013/0329111 A1 | 12/2013 | Desai et al. | |
| 2013/0335222 A1 | 12/2013 | Comerford et al. | |
| 2013/0342379 A1 | 12/2013 | Bauman et al. | |
| 2014/0043152 A1 | 2/2014 | Lippman et al. | |
| 2014/0068713 A1 | 3/2014 | Nicholson et al. | |
| 2014/0139454 A1 | 5/2014 | Mistry et al. | |
| 2014/0142783 A1 | 5/2014 | Grimm et al. | |
| 2014/0163774 A1 | 6/2014 | Demeniuk | |
| 2014/0164559 A1 | 6/2014 | Demeniuk | |

(56) References Cited

U.S. PATENT DOCUMENTS

| | | | |
|---|---|---|---|
| 2014/0200736 A1 | 7/2014 | Silvester | |
| 2014/0212002 A1 | 7/2014 | Curcio et al. | |
| 2014/0213287 A1 | 7/2014 | MacDonald et al. | |
| 2014/0215120 A1 | 7/2014 | Saylor et al. | |
| 2014/0226303 A1 | 8/2014 | Pasdar | |
| 2014/0258727 A1 | 9/2014 | Schmit et al. | |
| 2014/0277935 A1* | 9/2014 | Daman | G08G 1/127 701/36 |
| 2014/0309806 A1 | 10/2014 | Ricci | |
| 2014/0321321 A1 | 10/2014 | Knaappila | |
| 2014/0335902 A1 | 11/2014 | Guba et al. | |
| 2014/0375477 A1 | 12/2014 | Jain et al. | |
| 2014/0379175 A1 | 12/2014 | Mittermeier | |
| 2014/0380442 A1 | 12/2014 | Addepalli et al. | |
| 2015/0039877 A1 | 2/2015 | Hall et al. | |
| 2015/0048927 A1 | 2/2015 | Simmons | |
| 2015/0094088 A1 | 4/2015 | Chen | |
| 2015/0116085 A1 | 4/2015 | Juzswik | |
| 2015/0116100 A1 | 4/2015 | Yang et al. | |
| 2015/0123762 A1 | 5/2015 | Park et al. | |
| 2015/0126171 A1 | 5/2015 | Miller et al. | |
| 2015/0147974 A1 | 5/2015 | Tucker et al. | |
| 2015/0148990 A1 | 5/2015 | Patel | |
| 2015/0149042 A1 | 5/2015 | Cooper et al. | |
| 2015/0154531 A1 | 6/2015 | Skaaksrud | |
| 2015/0172902 A1 | 6/2015 | Kasslin et al. | |
| 2015/0178034 A1 | 6/2015 | Penilla et al. | |
| 2015/0181014 A1 | 6/2015 | Gerhardt et al. | |
| 2015/0204965 A1* | 7/2015 | Magarida | G01S 5/26 367/117 |
| 2015/0210287 A1 | 7/2015 | Penilla et al. | |
| 2015/0223151 A1 | 8/2015 | Lei et al. | |
| 2015/0256668 A1 | 9/2015 | Atkinson et al. | |
| 2015/0261219 A1 | 9/2015 | Cuddihy et al. | |
| 2015/0261573 A1 | 9/2015 | Rausch et al. | |
| 2015/0278164 A1 | 10/2015 | Kim et al. | |
| 2015/0283914 A1 | 10/2015 | Malone | |
| 2015/0294518 A1 | 10/2015 | Peplin et al. | |
| 2015/0332530 A1 | 11/2015 | Kishita | |
| 2015/0352953 A1 | 12/2015 | Koravadi | |
| 2015/0382160 A1 | 12/2015 | Slay, Jr. et al. | |
| 2016/0039430 A1 | 2/2016 | Ricci | |
| 2016/0055699 A1 | 2/2016 | Vincenti | |
| 2016/0119782 A1 | 4/2016 | Kim | |
| 2016/0133072 A1 | 5/2016 | Santavicca | |
| 2016/0203661 A1 | 7/2016 | Pudar et al. | |
| 2016/0214572 A1 | 7/2016 | Snider | |
| 2016/0248905 A1 | 8/2016 | Miller et al. | |
| 2016/0332535 A1 | 11/2016 | Bradley et al. | |

FOREIGN PATENT DOCUMENTS

| | | |
|---|---|---|
| JP | 2011131833 A | 7/2011 |
| WO | 2013052043 A1 | 4/2013 |

OTHER PUBLICATIONS

Shahzada, "Touch Interaction for User Authentication," Thesis, Carleton University, Ottawa, Ontario, May 2014 (124 pages).

Napa Sae-Bae et al., "Biometric-Rich Gestures: A Novel Approach to Authentication on Multi-touch Devices," NYU-Poly, CHI 2012, May 5-10, 2012, Austin, TX (10 pages).

Services-Bluetooth Development Portal, last accessed May 30, 2015, https://developer.bluetooth.org/gatt/services/Pages/ServicesHome.aspx. (1 page).

Azad, "The Quick Guide to GUIDs," Better Explained—Math insights that click, last accessed May 24, 2015, http://betterexplained.com/articles (15 pages).

Goodwin, "Add-on module auto-unlocks your car when your phone is near," CNET, Car Tech, Nov. 19, 2013, http://www.cnet.com/news/add-on-module-auto-unlocks-your-car-when-your-phone-is-near (2 pages).

Hertz 24/7, "Book. Unlock. Go. You can reserve your vehicle anywhere, anytime—up to 10 days in advance," last accessed Jul. 28, 2015, https://www.hertz247.com/parkridge/en-us/About (3 pages).

Klosowski, "Unlock Your Car with a Bluetooth Powered Keyless Entry System," Lifehacker, Sep. 30, 2013, http://lifehacker.com/unlock-your-car-with-a-bluetooth-powered-keyless-entry-1427088798 (2 pages).

Toyota, Toyota Prius C Brochure, 2015, available at http://www.toyota.com/priusc/ebrochure.

Thomas, "2010 Toyota Prius Touch Tracer Display," Mar. 3, 2009, available at https://www.cars.com/articles/2009/03/2010-toyota-prius-touch-tracer-display/.

Gahran, "Vehicle owner's manuals—now on smartphones," CNN.com, Jan. 31, 2011, available at http://www.cnn.com/2011/TECH/mobile/01/31/car.manual.phone/.

Specification of the Bluetooth System, Version 4.2, "Master Table of Contents & Compliance Requirements," Dec. 2, 2014, https://www.bluetooth.or/en-us/specification/adopted-specifications. (2,772 pages).

Bargshady et al., Precise Tracking of Things via Hybrid 3-D Fingerprint Database and Kernel Method Particle Filter, 2016, IEEE, p. 8963-8971.

Murugappan et al., Wireless EEG Signals based Neuromarketing System using Fast Fourier Transform (FFT), 2014, IEEE, p. 25-30.

Katoh et al., A Method of Advertisement Selection in Multiple RFID-Tags Sensor Network for a Ubiquitous Wide-Area Advertising Service, 2008, IEEE, p. 519-524.

General Motors Corporation; Pontiac GTO Owner's Manual; 2005; pp. 3-19 and 3-20; https://my.gm.com/content/dam/gmownercenter/gmna/dynamic/manuals/2006/pontiac/gto/2006_gto_owners.pdf.

* cited by examiner

SYMMETRICAL REFERENCE PERSONAL DEVICE LOCATION TRACKING

TECHNICAL FIELD

Aspects of the disclosure generally relate to tracking of locations of personal devices using a symmetrical layout of references within a vehicle cabin.

BACKGROUND

Smartphone and wearable device sales volumes continue to increase. Thus, more such devices are brought by users into the automotive context. Smartphones can already be used in some vehicle models to access a wide range of vehicle information, to start the vehicle, and to open windows and doors. Some wearables are capable of providing real-time navigation information to the driver. Device manufacturers are implementing frameworks to enable a more seamless integration of their brand of personal devices into the driving experience.

SUMMARY

In a first illustrative embodiment, a system includes first, second, third, and fourth in-vehicle components arranged symmetrically within and delimiting boundaries of a vehicle interior; and a processor programmed to identify signal strength information indicative of distance of a personal device from wireless transceivers of each of the in-vehicle components; and compute, using the signal strength information, a quadrant and diagonal sector including a location of the personal device, and whether the location is within the vehicle interior.

In a second illustrative embodiment, a computer-implemented method includes identifying a quadrant of a vehicle including a location of a personal device by comparing signal strength information of pairs of wireless transceivers in adjacent quadrants to signal strength information of wireless transceivers opposite the pairs; and determining a diagonal sector including the location by comparing the signal strength information from the wireless transceiver of the quadrant to the signal strength information from the wireless transceiver diagonally-opposite to the quadrant.

In a third illustrative embodiment, a system includes a personal device including a wireless transceiver; and a processor programmed to identify signal strength information indicative of distance of the personal device from wireless transceivers of each of first, second, third, and fourth in-vehicle components arranged symmetrically within and delimiting boundaries of a vehicle interior; and compute, using the signal strength information, a quadrant and diagonal sector including a location of the personal device.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As smartphones, tablets, and other personal devices become more powerful and interconnected, there is an opportunity to integrate more intelligence and sensing into components of the vehicle interior. Traditional vehicle interior modules, such as reading lights or speakers, may be enhanced with a communication interface (such as Bluetooth Low Energy (BLE)). These enhanced modules of the vehicle interior may be referred to as in-vehicle components. The vehicle occupants may utilize their personal devices to control features of the in-vehicle components by connecting their personal devices to the in-vehicle components over the communications interface. In an example, a vehicle occupant may utilize an application installed to the personal device to turn the reading light on or off, or to adjust a volume of the speaker. In many cases, it may be desirable for a vehicle occupant to be able to control the in-vehicle components that relate to the seat in which the vehicle occupant is located.

Personal device location and tracking systems and methods may be employed using power signals from the mesh of interior in-vehicle components. For example, the RSSI (signal strength) of the in-vehicle components may be used to determine whether the personal device is located inside or outside a vehicle, and if inside, to which passenger it belongs. Identifying whether a personal device is inside or outside a vehicle can greatly simplify the user experience. In an example, tedious pairing procedures may be avoided for personal devices confirmed as being located within the vehicle interior. In a "mobility" future, where people could use a variety of different vehicles in the course of a day, being able to interact with them without the need for repeated validation procedures may greatly enhance the user experience.

Figure 1A:
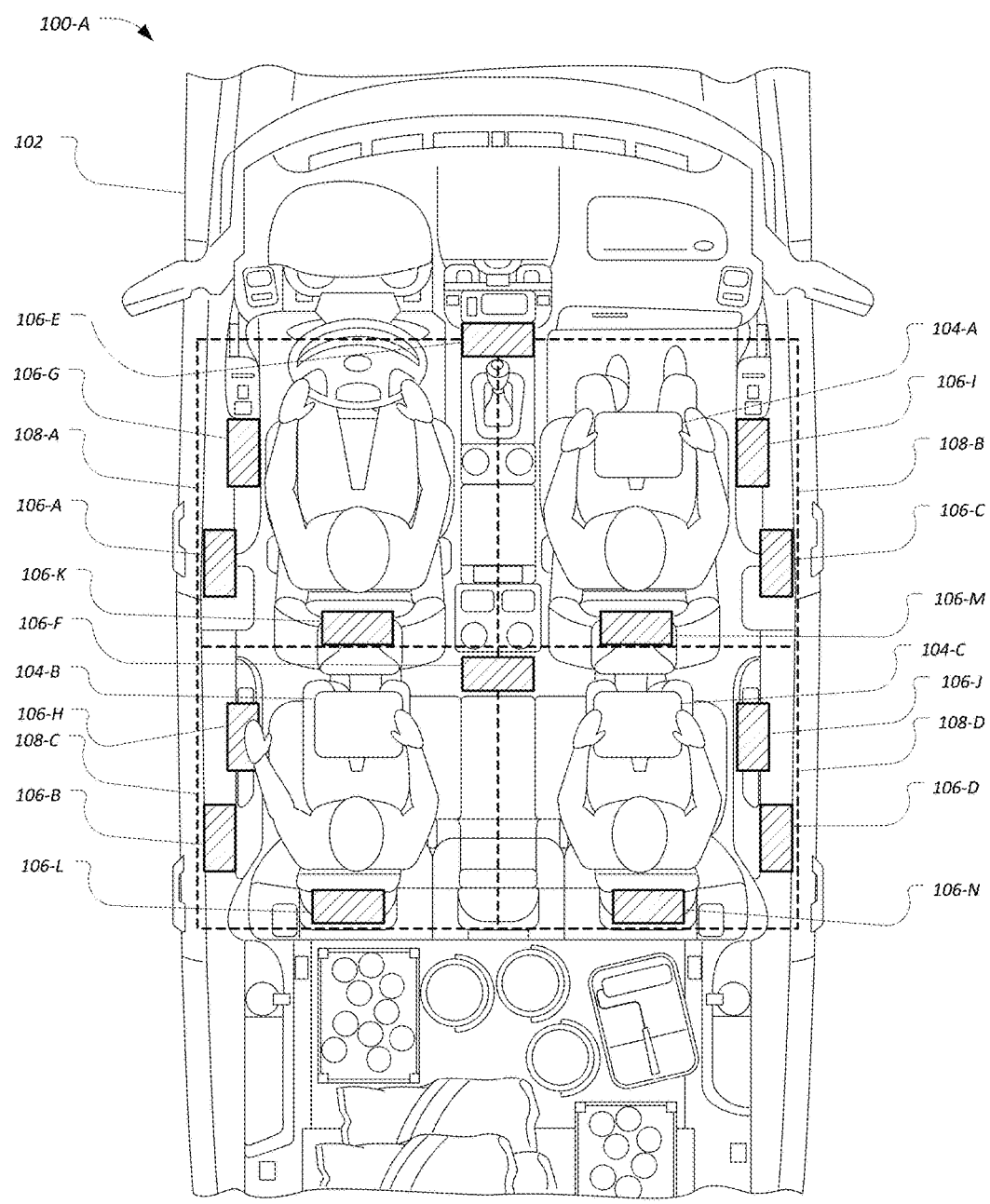
FIG. 1A illustrates an example system including a vehicle having a mesh of in-vehicle components configured to interact with users and user devices.

FIG. 1A illustrates an example system 100 including a vehicle 102 having a mesh of in-vehicle components 106 configured to interact with users and personal devices 104 of the users. The system 100 may be configured to allow the users, such as vehicle occupants, to seamlessly interact with the in-vehicle components 106 in the vehicle 102 or with any other framework-enabled vehicle 102. Moreover, the interaction may be performed without requiring the personal devices 104 to have been paired with or be in communication with a head unit or other centralized computing platform of the vehicle 102.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The personal devices 104-A, 104-B and 104-C (collectively 104) may include mobile devices of the users, and/or wearable devices of the users. The mobile devices may be any of various types of portable computing device, such as cellular phones, tablet computers, smart watches, laptop computers, portable music players, or other devices capable of networked communication with other mobile devices. The wearable devices may include, as some non-limiting examples, smartwatches, smart glasses, fitness bands, control rings, or other personal mobility or accessory device designed to be worn and to communicate with the user's mobile device.

The in-vehicle components 106-A through 106-N (collectively 106) may include various elements of the vehicle 102 having user-configurable settings. These in-vehicle components 106 may include, as some examples, overhead light in-vehicle components 106-A through 106-D, climate control in-vehicle components 106-E and 106-F, seat control in-vehicle components 106-G through 106-J, and speaker in-vehicle components 106-K through 106-N. Other examples of in-vehicle components 106 are possible as well, such as rear seat entertainment screens or automated window shades. In many cases, the in-vehicle component 106 may expose controls such as buttons, sliders, and touchscreens that may be used by the user to configure the particular settings of the in-vehicle component 106. As some possibilities, the controls of the in-vehicle component 106 may allow the user to set a lighting level of a light control, set a temperature of a climate control, set a volume and source of audio for a speaker, and set a position of a seat.

The vehicle 102 interior may be divided into multiple zones 108, where each zone 108 may be associated with a seating position within the vehicle 102 interior. For instance, the front row of the illustrated vehicle 102 may include a first zone 108-A associated with the driver seating position, and a second zone 108-B associated with a front passenger seating position. The second row of the illustrated vehicle 102 may include a third zone 108-C associated with a driver-side rear seating position and a fourth zone 108-D associated with a passenger-side rear seating position. Variations on the number and arrangement of zones 108 are possible. For instance, an alternate second row may include an additional fifth zone 108 of a second-row middle seating position (not shown). Four occupants are illustrated as being inside the example vehicle 102, three of whom are using personal devices 104. A driver occupant in the zone 108-A is not using a personal device 104. A front passenger occupant in the zone 108-B is using the personal device 104-A. A rear driver-side passenger occupant in the zone 108-C is using the personal device 104-B. A rear passenger-side passenger occupant in the zone 108-D is using the personal device 104-C.

Each of the various in-vehicle components 106 present in the vehicle 102 interior may be associated with the one or more of the zones 108. As some examples, the in-vehicle components 106 may be associated with the zone 108 in which the respective in-vehicle component 106 is located and/or the one (or more) of the zones 108 that is controlled by the respective in-vehicle component 106. For instance, the light in-vehicle component 106-C accessible by the front passenger may be associated with the second zone 108-B, while the light in-vehicle component 106-D accessible by passenger-side rear may be associated with the fourth zone 108-D. It should be noted that the illustrated portion of the vehicle 102 in FIG. 1A is merely an example, and more, fewer, and/or differently located in-vehicle components 106 and zones 108 may be used.

Figure 1B:
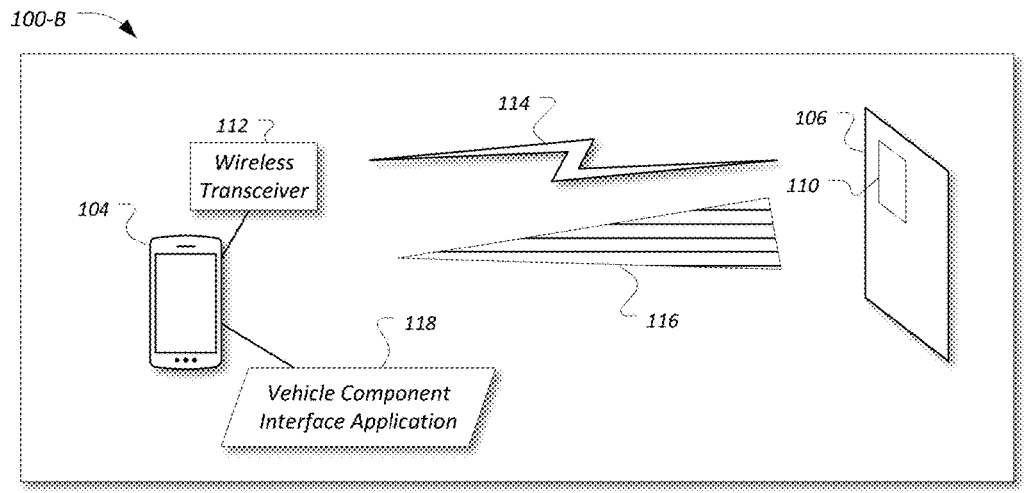
FIG. 1B illustrates an example in-vehicle component equipped with a wireless transceiver configured to facilitate detection of and identify proximity of the personal devices.

Referring to FIG. 1B, each in-vehicle component 106 may be equipped with a wireless transceiver 110 configured to facilitate detection of and identify proximity of the personal devices 104. In an example, the wireless transceiver 110 may include a wireless device, such as a Bluetooth Low Energy transceiver configured to enable low energy Bluetooth signal intensity as a locator, to determine the proximity of the personal devices 104. Detection of proximity of the personal device 104 by the wireless transceiver 110 may, in an example, cause a vehicle component interface application 118 of the detected personal device 104 to be activated.

In many examples the personal devices 104 may include a wireless transceiver 112 (e.g., a BLUETOOTH module, a ZIGBEE transceiver, a Wi-Fi transceiver, an IrDA transceiver, an RFID transceiver, etc.) configured to communicate with other compatible devices. In an example, the wireless transceiver 112 of the personal device 104 may communicate data with the wireless transceiver 110 of the in-vehicle component 106 over a wireless connection 114. In another example, a wireless transceiver 112 of a wearable personal device 104 may communicate data with a wireless transceiver 112 of a mobile personal device 104 over a wireless connection 114. The wireless connections 114 may be a Bluetooth Low Energy (BLE) connection, but other types of local wireless connection 114, such as Wi-Fi or Zigbee may be utilized as well.

The personal devices 104 may also include a device modem configured to facilitate communication of the personal devices 104 with other devices over a communications network. The communications network may provide communications services, such as packet-switched network services (e.g., Internet access, VoIP communication services), to devices connected to the communications network. An example of a communications network may include a cellular telephone network. To facilitate the communications over the communications network, personal devices 104 may be associated with unique device identifiers (e.g., mobile device numbers (MDNs), Internet protocol (IP) addresses, identifiers of the device modems, etc.) to identify the communications of the personal devices 104 over the communications network. These personal device 104 identifiers may also be utilized by the in-vehicle component 106 to identify the personal devices 104.

The vehicle component interface application 118 may be an application installed to the personal device 104. The vehicle component interface application 118 may be configured to facilitate vehicle occupant access to features of the in-vehicle components 106 exposed for networked configuration via the wireless transceiver 110. In some cases, the vehicle component interface application 118 may be configured to identify the available in-vehicle components 106, identify the available features and current settings of the identified in-vehicle components 106, and determine which of the available in-vehicle components 106 are within proximity to the vehicle occupant (e.g., in the same zone 108 as the location of the personal device 104). The vehicle component interface application 118 may be further configured to display a user interface descriptive of the available features, receive user input, and provide commands based on the user input to allow the user to control the features of the in-vehicle components 106. Thus, the system 100 may be configured to allow vehicle occupants to seamlessly interact with the in-vehicle components 106 in the vehicle 102, without requiring the personal devices 104 to have been paired with or be in communication with a head unit of the vehicle 102.

To determine the in-vehicle components 106 that are in the same zone as the personal device 104, the system 100 may use one or more device location-tracking techniques to identify the zone 108 in which the personal device 104 is located. Location-tracking techniques may be classified depending on whether the estimate is based on proximity, angulation or lateration. Proximity methods are "coarse-grained," and may provide information regarding whether a target is within a predefined range but they do not provide an exact location of the target. Angulation methods estimate a position of the target according to angles between the target and reference locations. Lateration provide an estimate of the target location, starting from available distances between target and references. The distance of the target from a reference can be obtained from a measurement of signal strength 116 over the wireless connection 114 between the wireless transceiver 110 of the in-vehicle component 106 and the wireless transceiver 112 of the personal device 104, or from a time measurement of either arrival (TOA) or difference of arrival (TDOA).

One of the advantages of lateration using signal strength 116 is that it can leverage the already-existing received signal strength indication (RSSI) signal strength 116 information available in many communication protocols. For example, iBeacon uses the RSSI signal strength 116 information available in the Bluetooth Low-Energy (BLE) protocol to infer the distance of a beacon from a personal device 104 (i.e. a target), so that specific events can be triggered as the personal device 104 approaches the beacon. Other implementations expand on the concept, leveraging multiple references to estimate the location of the target. When the distance from three reference beacons are known, the location can be estimated in full (trilateration) from the following equations:

$$d_1^2 = (x-x_1)^2 + (y-y_1)^2 + (z-z_1)^2$$
$$d_2^2 = (x-x_2)^2 + (y-y_2)^2 + (z-z_2)^2$$
$$d_3^2 = (x-x_3)^2 + (y-y_3)^2 + (z-z_3)^2 \qquad (1)$$

Figure 1C:
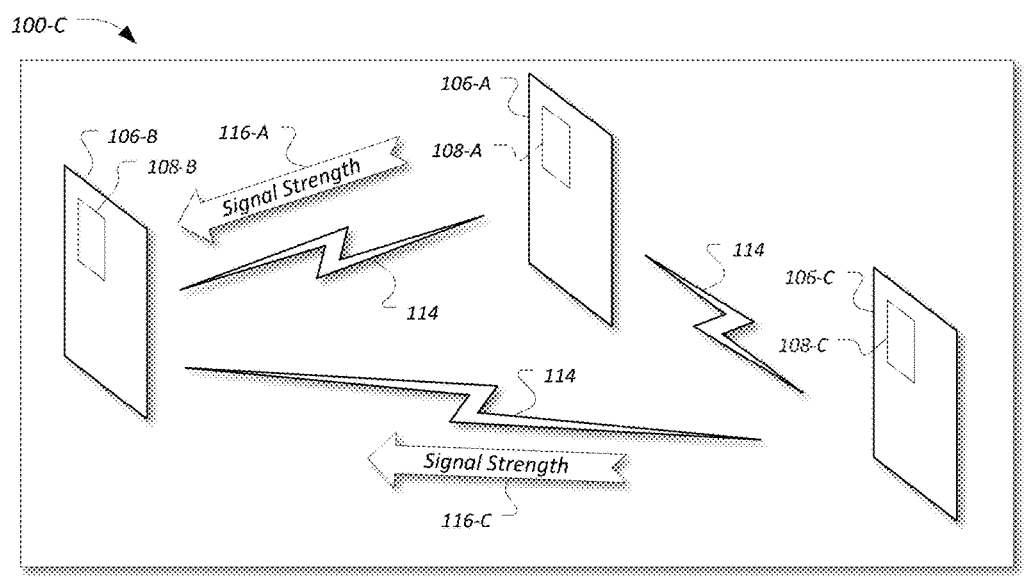
FIG. 1C illustrates an example in-vehicle component requesting signal strength from other in-vehicle components of the vehicle.

In an example, as shown in FIG. 1C, an in-vehicle component 106-B may broadcast or otherwise send a request for signal strength 116 to other in-vehicle components 106-A and 106-C of the vehicle 102. This request may cause the other in-vehicle components 106-A and 106-C to return wireless signal strength 116 data identified by their respective wireless transceiver 110 for whatever devices they detect (e.g., signal strength 116-A for the personal device 104 identified by the wireless transceiver 110-A, signal strength 116-C for the personal device 104 identified by the wireless transceiver 110-C). Using these signal strengths 116-A and 116-C, as well as signal strength 116-B determined by the in-vehicle component 106-B using its wireless transceiver 110-B, the in-vehicle component 106-B may use the equations (1) to perform trilateration and locate the personal device 104.

However, use of signal strength 116 may require calibration of a known power at a known distance. As an example, the signal power received at a distance d from a transmitter can be calculated as an attenuation of a known power $P_{d0}$ at a known distance $d_0$:

$$P_r = \frac{P_{(d_0)}}{(d/d_0)^n} \qquad (2)$$

Notably, the path loss exponent n of equation (2) is a function of the environment. In dynamically changing environments, such as the interior of the vehicle 102, the value of n is neither a known nor a fixed quantity. Moreover, many different approaches to estimating distance from the signal strength 116 in the presence of unknown environmental factors require significant computational processing power.

Distance may be estimated from signal strength 116 as follows, with constant A determined by calibration:

$$\text{RSSI (dBm)} = -10n \log 10(d) + A \qquad (3)$$

As a function of distance, and for n in the 2-3 range, distance d may be approximated from the reference signal as follows:

$$d = 10^{-\frac{RSSI}{20}} k \qquad (4)$$

Unless a thorough calibration is performed, one may expect k to be within a certain range, but may be unable to extract a reasonably good estimate for the distance d.

However, tracking may be achieved by reliance on data from multiple wireless transceivers 110 with an assumption of symmetry in the relative locations of the wireless transceivers 110 and in environmental geometry of the surroundings of the sensors. Accordingly, an improved method to estimate location of personal devices 104 may be performed based on unprocessed signal strength 116 data, utilizing an assumption of a symmetrical layout of the references of the vehicle 102. These references may include, in an example, the signal strengths from the wireless transceivers 110 of in-vehicle components 106 having a relatively symmetrical layout within the vehicle 102 cabin. In an example, the method may be utilized for determining whether a personal device 104 is located inside or outside the vehicle 102.

Figure 2:
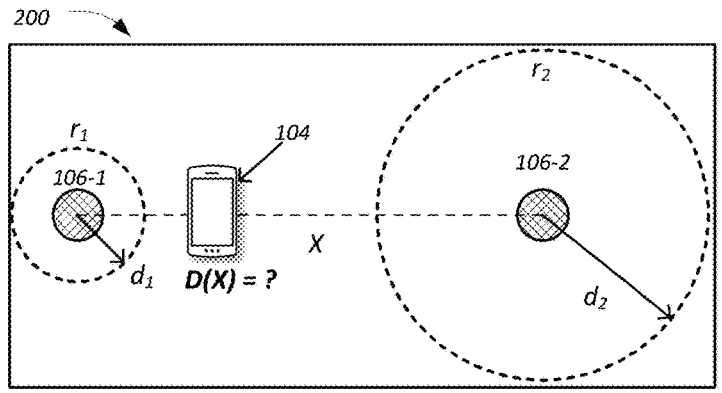
FIG. 2 illustrates an example diagram of un-calibrated distance estimates of two reference wireless transceivers from a personal device.

For sake of explanation, an analysis may be performed of locating an object in one dimension, using two references. In such an example, the single dimension may be considered to be a line traversing a row of seats in a vehicle 102, e.g., from door to door, at lap level. FIG. 2 illustrates an example diagram 200 of un-calibrated distance estimates $d_1$ and $d_2$ of two reference in-vehicle components 106-1 and 106-2, respectively, from a personal device 104 (e.g., device D). Because the instant example is using un-calibrated distance estimates $d_1$ and $d_2$ determined between the wireless transceivers 110 of the in-vehicle components 106-1 and 106-2 and the personal device 104 (e.g., device D at location x), the two "proximity" circles $r_1$ and $r_2$ do not touch one another at the location x of the device D. (Properly-calibrated signal strength 116 information from the wireless transceivers 110 of the in-vehicle components 106-1 and 106-2 would ensure the "proximity" circles $r_1$ and $r_2$ determined according to the distance estimates $d_1$ and $d_2$ do touch one another at the location x of the device D.) As the distance estimates $d_1$ and $d_2$ are un-calibrated, to find the location of device D (i.e., location x) a scalar k may be used to scale the distance estimates $d_1$ and $d_2$ until the two "proximity" circles $r_1$ and $r_2$ match at x.

Using equation (4) for distance, and assuming the same wireless transceiver 110 transmitting power level and same environment power attenuation for the two wireless transceivers 110, the three possible analytical solutions for $x_2 > x_1$ may be formed as follows:

$$(A)\ x_1 + kd_1 = x_2 - kd_2 \Rightarrow k = \frac{x_2 - x_1}{d_1 + d_2} \quad (5)$$

$$(B)\ x_1 - kd_1 = x_2 - kd_2 \Rightarrow k = \frac{x_2 - x_1}{d_2 - d_1}$$

$$(C)\ x_1 + kd_1 = x_2 + kd_2 \Rightarrow k = \frac{x_2 - x_1}{d_1 - d_2}$$

It should be noted that solution (B) is possible only for $d_2 > d_1$, while solution (C) is possible only for $d_1 > d_2$.

Figure 3:
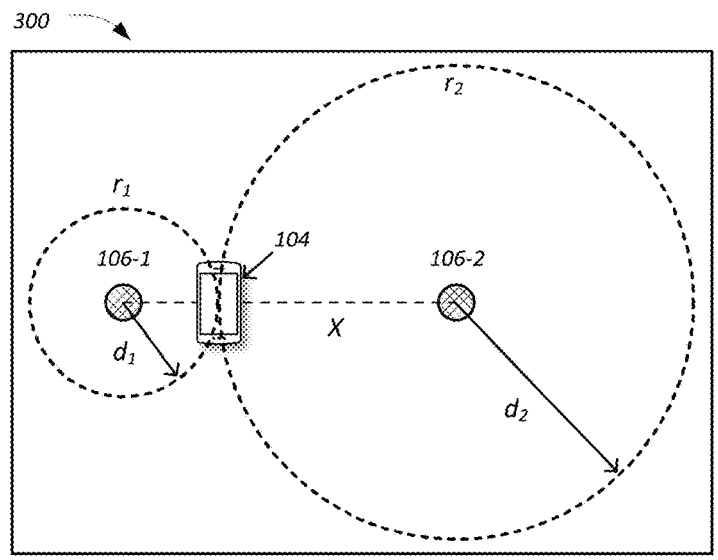
FIG. 3 illustrates an example diagram of a first solution estimate of the location of the personal device according to signal strength of signals received from in-vehicle components.

FIG. 3 illustrates an example diagram 300 of a first solution estimate of the location of the personal device 104 according to signal strength 116 of signals received from in-vehicle components 106. In the case as illustrated in FIG. 3, the first solution lies in-between the two reference wireless transceivers 110-A and 110-B.

Figure 4:
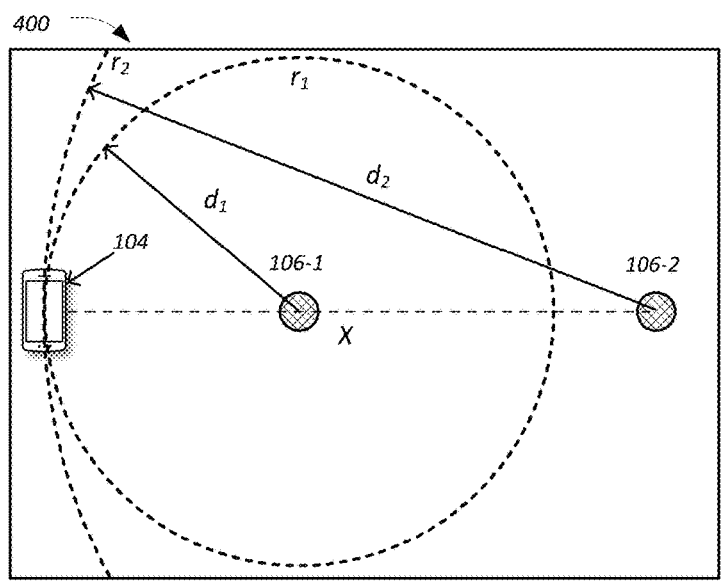
FIG. 4 illustrates an example diagram of a second solution estimate of the location of the personal device according to signal strength of signals received from in-vehicle components.

FIG. 4 illustrates an example diagram 400 of a second solution estimate of the location of the personal device 104 according to signal strength 116 of signals received from in-vehicle components 106. As illustrated in FIG. 4, the second solution lies to the left of reference wireless transceivers 110-A (i.e., left of the in-vehicle component 106-1). In other words, given the un-calibrated distance estimates $d_1$ and $d_2$ from two reference point wireless transceivers 110-A and 110-B, unless the estimates are equal, there are two possible solutions: one in-between the two references, and another outside of the reference with the stronger of the two signal strengths 116.

Figure 5:
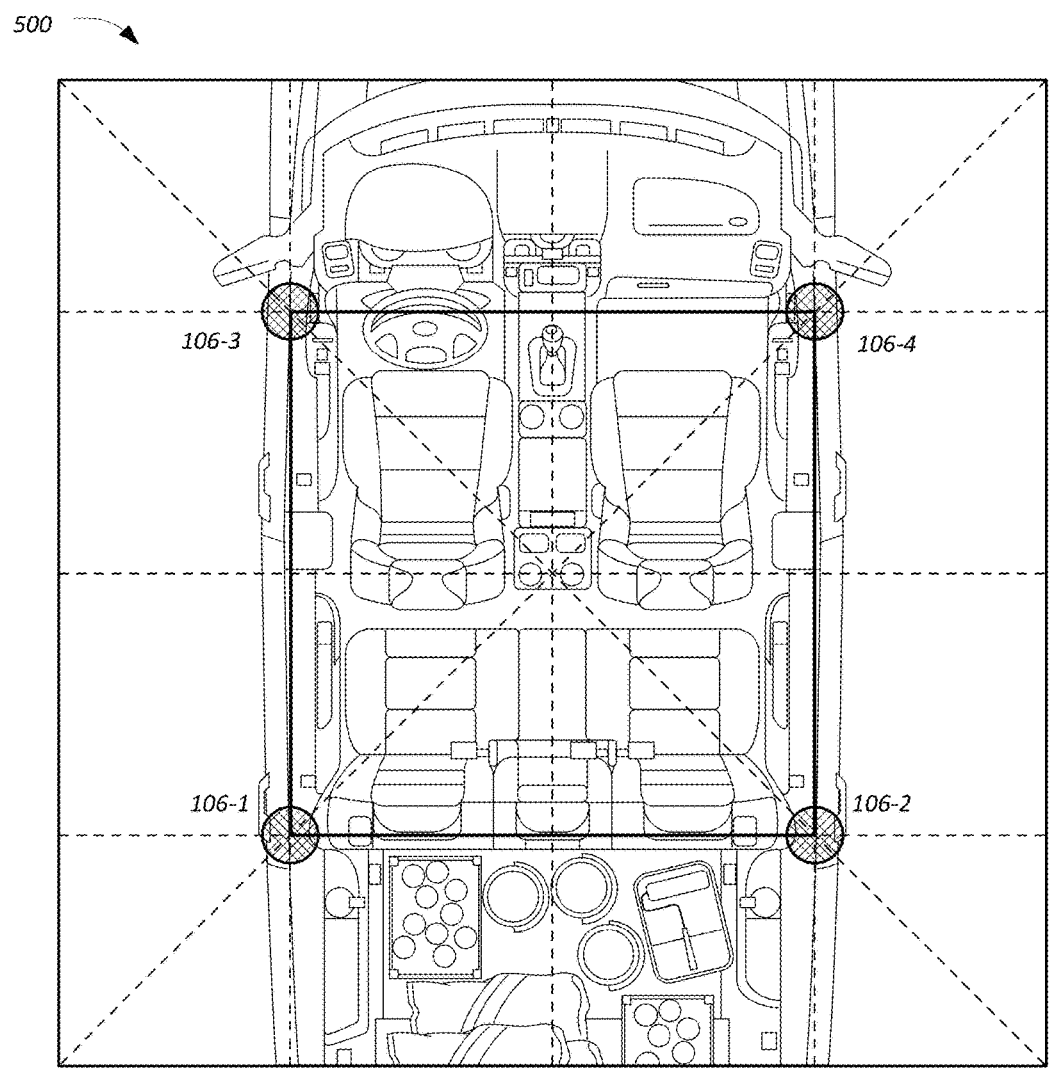
FIG. 5 illustrates an example diagram of a symmetrical layout of in-vehicle components delimiting an interior boundary of a vehicle interior.

FIG. 5 illustrates an example diagram 500 of a symmetrical layout of in-vehicle components 106-1, 106-2, 1-6-3 and 106-4 delimiting an interior boundary of a vehicle 102 interior. Thus, the tracking/locating concept may be extended from one dimension to two dimensions of a vehicle 102 interior. If a personal device 104 is determined to be inside the vehicle 102, the personal device 104 may be safely granted access to the appropriate vehicle 102 features. If instead the personal device 104 is deemed to be outside of the vehicle 102, access to the in-vehicle components 106 may be denied, unless some other handshake or confirmation of identity of the personal device 104 can be performed. The location/tracking of the personal device 104 may additionally or alternately be used to locate the zone 108 of the vehicle 102 in which the personal device 104 is located. For instance, the zone 108 may be identified to determine whether the personal device 104 belongs to the driver (e.g., zone 108-A of FIG. 1A), to a front-seat passenger (e.g., zone 108-B of FIG. 1A), or to another vehicle occupant located in a back row of the vehicle 102 cabin (e.g., zones 108-C or 108-D of FIG. 1A). The location/tracking of the personal device 104 may additionally or alternatively be used to extract "rough" gesture metrics from the tracking data. Notably, accuracy of the rough gesture detection may depend on the packet refresh rate of the single strength 116 data captured by the wireless transceivers 110.

Figure 6:
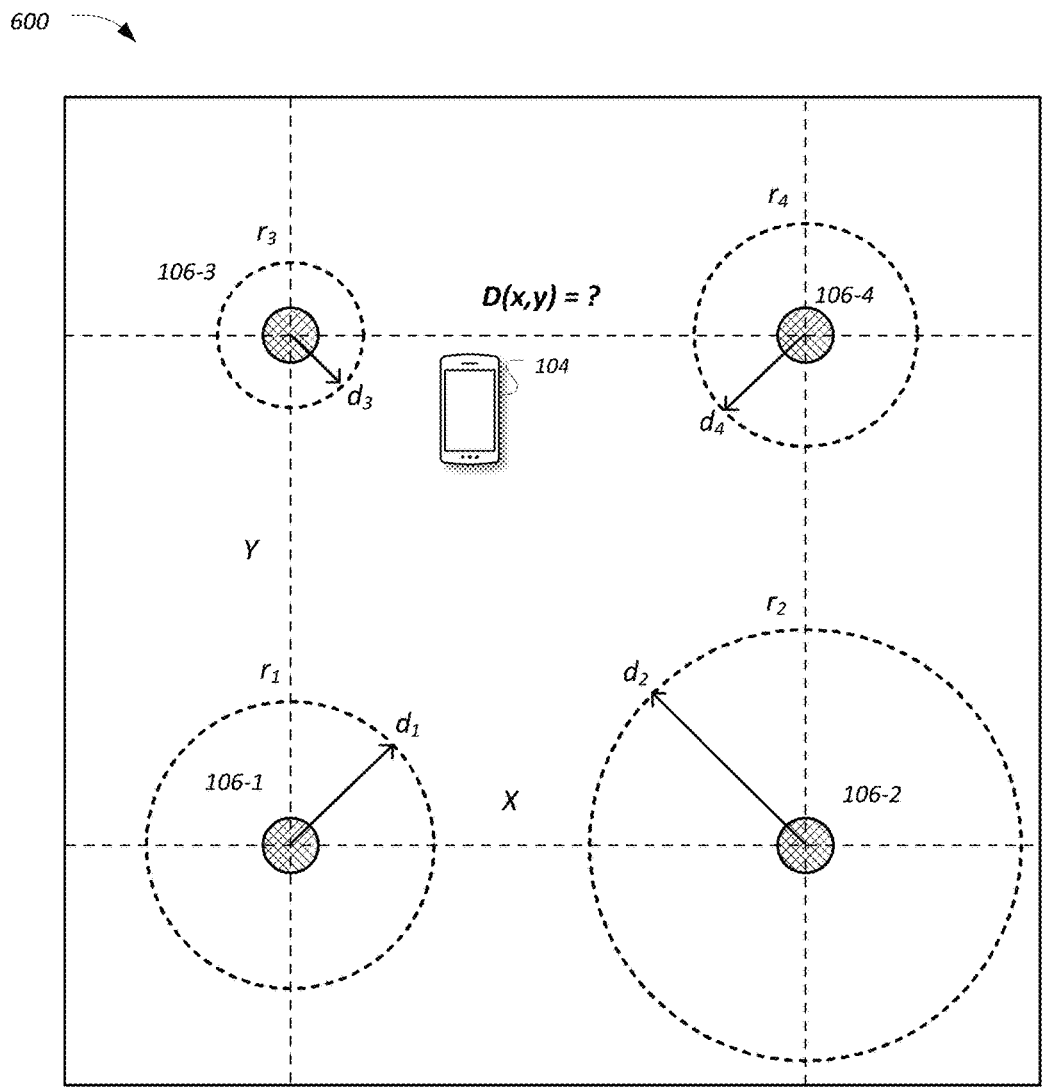
FIG. 6 illustrates an example diagram of determining the location of the personal device 104 using four-point lateration.

FIG. 6 illustrates an example diagram 600 of determining the location of the personal device 104 using four-point lateration. As shown, the information available consists of the relative coordinates of the four symmetric reference transmitters, separated by distances X and Y, and the un-calibrated distance estimates, $d_1$, $d_2$, $d_3$, and $d_4$, obtained from the signal strength 116 levels captured by the in-vehicle components 106-1, 106-2, 1-6-3 and 106-4, respectively, from the personal device 104. The personal device 104 is located at X and Y coordinates that are to be determined. These coordinates of the personal device 104 may be referred to herein as D(x, y).

In an example, location of the personal device 104 may be determined by minimizing the function:

$$\sum_{i=1}^{4} \left( \sqrt{(x - x_i)^2 + (y - y_i)^2} - kd_i \right)^2 \quad (6)$$

However, the minimization as illustrated in equation (6) may be computationally expensive, and in some cases beyond the computational capabilities of the in-vehicle component 106 or other embedded microcontroller (MCU) of the vehicle 102 if the desire is to keep the cost of the implementation low.

Figure 7:
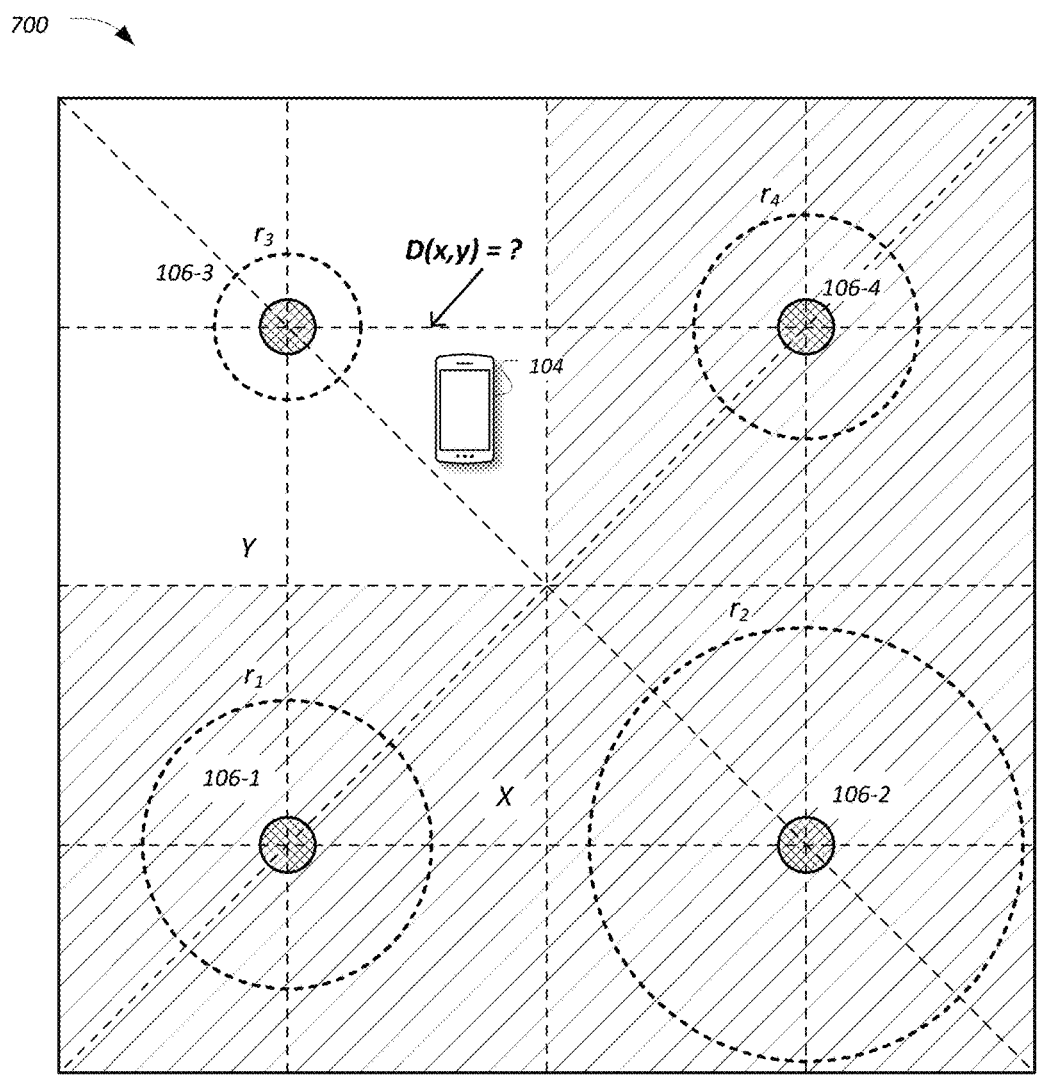
FIG. 7 illustrates an example diagram of removing zones from consideration as location targets by comparing couples of signal strengths received from wireless transceivers.

FIG. 7 illustrates an example diagram 700 of removing zones 108 from consideration as location targets by comparing couples of signal strengths 116 received from wireless transceivers 110. The signal strengths 116 may be received from in-vehicle components 106 of the same type located at relatively symmetrical locations within the different zones 108 of the vehicle 102 cabin. By recognizing the symmetrical layout of the vehicle 102, and the un-calibrated but likely similar sensitivity of the same-type in-vehicle components 106, zones 108 of the vehicle 102 may be eliminated as candidate target regions that include the personal device 104 by comparisons of signal strength 116/distance estimates from the wireless transceivers 110.

As illustrated the un-calibrated but similar sensitivity signal strength 116 measurements from in-vehicle components 106-1 and 106-2 are weaker than the un-calibrated but similar sensitivity signal strength 116 measurements from in-vehicle components 106-3 and 106-4, respectively. This is illustrated in the diagram 700 as relatively larger radii $r_1$ and $r_2$ as compared to radii $r_3$ and $r_4$. As the signal strength 116 measurements from the in-vehicle components 106-1 and 106-2 are weaker, these measurement may exclude the possibility of the personal device 104 being located in the bottom half of the vehicle 102 interior/exterior. Additionally, the signal strength 116 measurements from in-vehicle components 106-2 and 106-4 are weaker than the signal strength 116 measurements from in-vehicle components 106-1 and 106-3, respectively. This similarly may exclude the possibility of the personal device 104 being located in the right side of the vehicle 102 interior/exterior.

Figure 8:
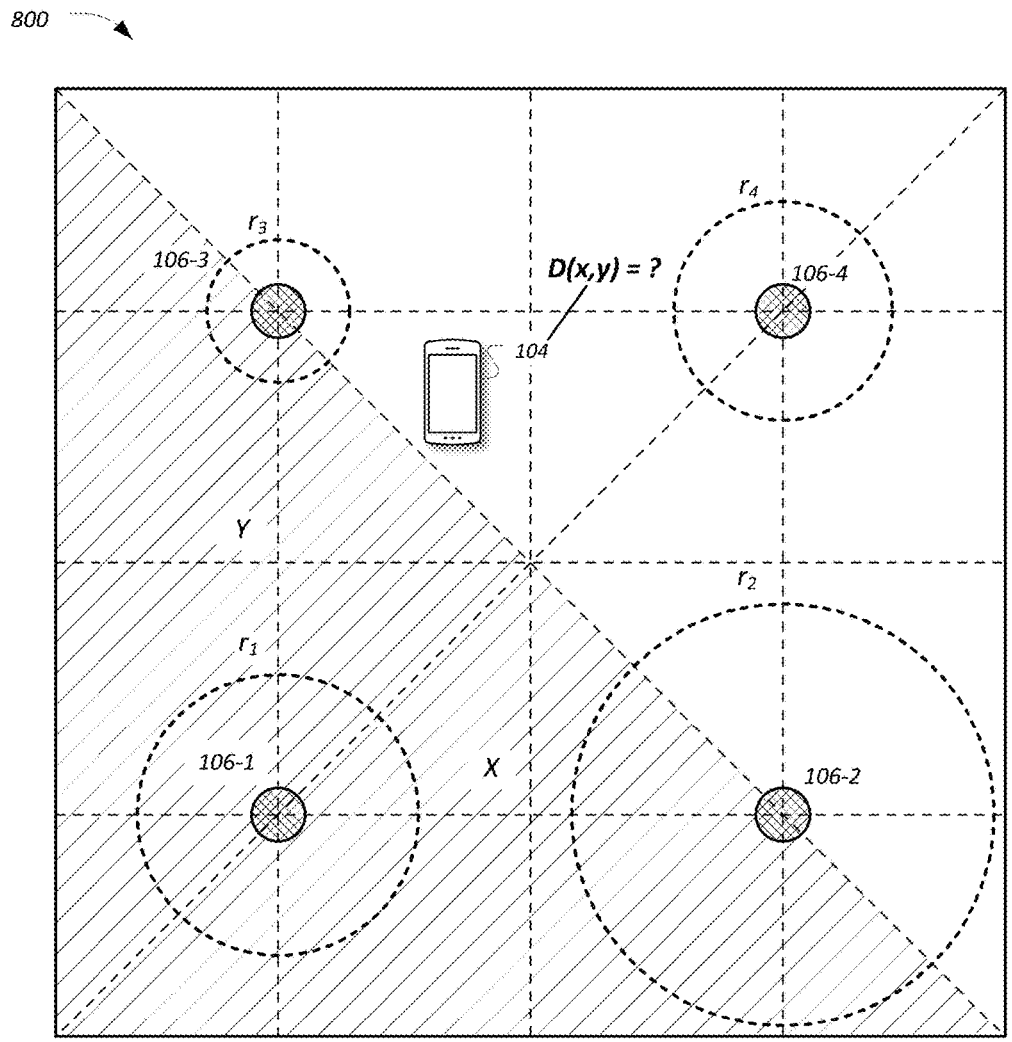
FIG. 8 illustrates an example diagram of removing diagonal sectors by comparing individual corner transmitter signal strengths.

FIG. 8 illustrates an example diagram 800 of removing diagonal sectors by comparing signal strengths 116 received from individual corner wireless transceivers 110. As shown in the diagram 800, the signal strength 116 measurements from in-vehicle component 106-1 is weaker than the signal strength 116 measurements from in-vehicle component 116-4. The personal device 104 therefore cannot be located in the zone 108-D to the bottom-left of the symmetry diagonal, as shown in the diagram 800.

Figure 9:
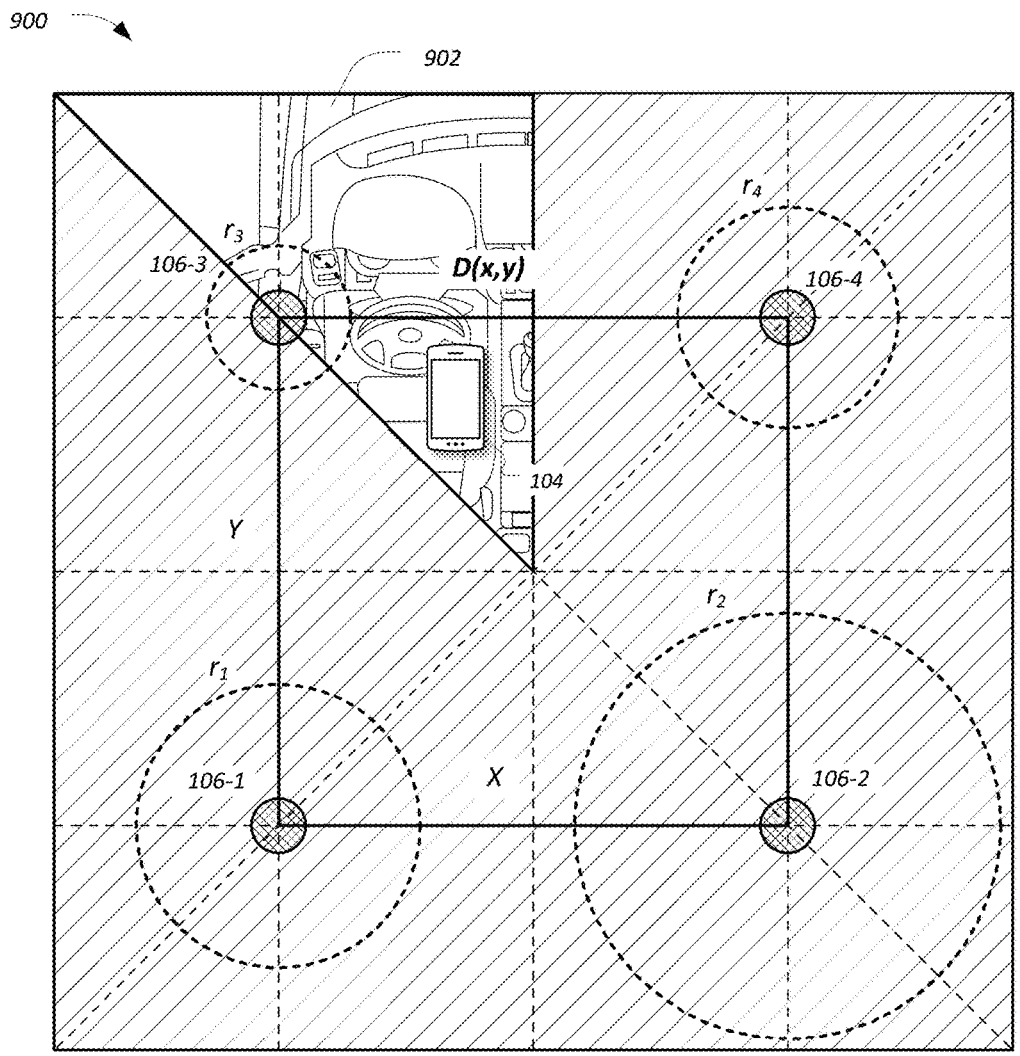
FIG. 9 illustrates an example diagram illustrating a region including a location target candidate for the personal device.

FIG. 9 illustrates an example diagram 900 illustrating a region including a location target candidate for the personal device 104. Accordingly, by combining the zone 108 quadrant information shown in the diagram 700 and the diagonal sector information illustrated in the diagram 800, a triangular region 902 including the location of the personal device 104 is identified. The triangular region 902 is as highlighted in the diagram 900.

Similar to the single-dimension tracking described above with respect to FIGS. 2-4, it can be identified that, properly scaled, the distance estimates d may provide two possible tracking locations, with one solution on the inside of the vehicle 102 and the other on the outside of the vehicle 102. FIG. 9 accordingly illustrates a shaded triangle or diagonal sector, on the center-left top quadrant is the location target candidate. Notably, a portion of the diagonal sector is located inside of the vehicle 102, and another portion of the diagonal sector is located outside of the vehicle 102.

While the vehicle 102 interior of the diagram 700 is split into four zones 108-A, 108-B, 108-C and 108-D, this is but one example. For a vehicle 102 with more than two seating rows, additional couples of reference in-vehicle component 106 wireless transmitters 110 and zones 108 may be added. In an alternate example, six wireless transceivers 110 and zones 108 may be utilized for a three row vehicle 102.

Figure 10:
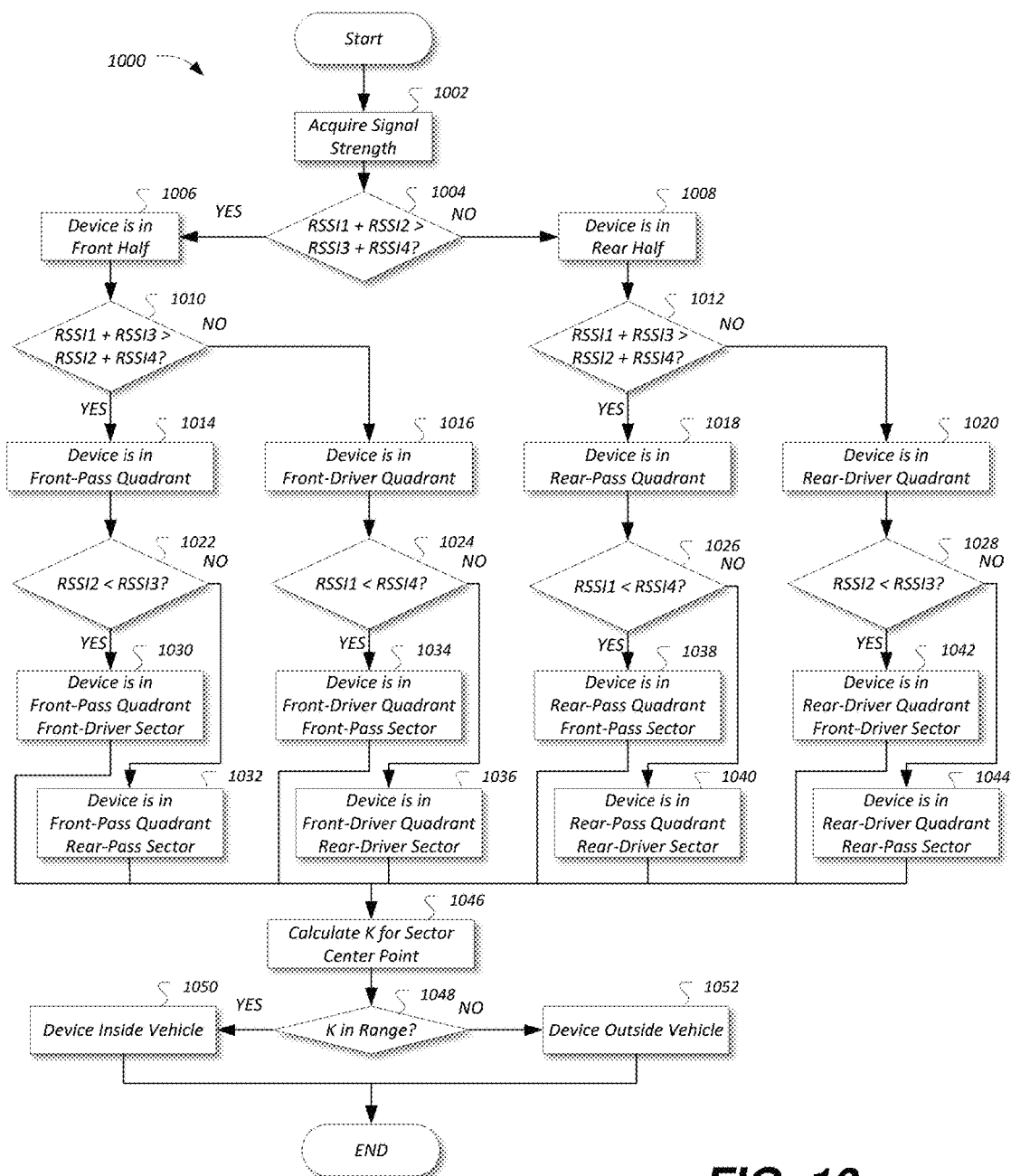
FIG. 10 illustrates an example flow diagram of the lateration method for determining the location estimate for the personal device.

FIG. 10 illustrates an example flow diagram of the lateration process 1000 for determining the location estimate for the personal device 104. In an example, the process 1000 may be performed by one of the in-vehicle components 106 of the vehicle 102 in communication with other in-vehicle components 106 of the vehicle 102. In another example, the process 1000 may be performed by the personal device 104 in communication with the in-vehicle components 106 of the vehicle 102. For sake of explanation, the device performing the lateration process 1000 may be referred to as the location estimator device. Also for sake of explanation and as illustrated in the diagrams 100-A, 500, 600, 700, 800 and 900, the in-vehicle components 106 may include the four in-vehicle components 106-1, 106-2, 106-3 and 106-4 located at relatively symmetrical locations within the zones 108-A, 108-B, 108-C and 108-D of the vehicle 102 and operating with similar sensitivity to one another.

The process 1000 may include three phases. In one phase, the quadrant/diagonal sector indicative of a best estimated location of the personal device 104 is found according to the signal strength 116 measurements. In another phase, an estimate for parameter k to match the center point of that diagonal sector is calculated. Depending whether k falls inside a specific range the location estimator device can infer whether the signal attenuation matches an inside vs. outside the vehicle 102 pattern. In a third phase, if the personal device 104 is found to be inside the vehicle 102, further iterations, using for example the Newton-Raphson method for finding successively better approximations to the function roots, may be performed to improve the personal device 104 location accuracy.

More specifically, at operation 1002, the location estimator device acquires signal strength 116 information. In an example, one of the in-vehicle components 106 may broadcast or otherwise send a request for signal strength 116 to the other in-vehicle components 106 of the vehicle 102. This request may cause the other in-vehicle components 106 to return wireless signal strength 116 data identified by their respective wireless transceiver 110 for the personal devices 104 that are detected. In another example, the personal device 104 acting as the location estimator device may determine the signal strength 116 of the personal device 104 to the in-vehicle components 106. Purely for sake of explanation of the process 1000, the location estimator device may receive signal strength 116-1, 116-2, 116-3, and 116-4 from in-vehicle components 106-1, 106-2, 106-3 and 106-4, respectively, located in zones 108-C, 108-D, 108-A and 108-B, respectively.

At operation 1004, the location estimator device determines whether a sum of the signal strength 116-1 and signal strength 116-2 is greater than a sum of the signal strength 116-3 and signal strength 116-4. If so, control passes to operation 1006 in which the personal device 104 is identified as being in front of the middle of the vehicle 102. Otherwise, control passes to operation 1008 in which the personal device 104 is identified as being rear of the middle of the vehicle 102. After operation 1006 control passes to operation 1010. After operation 1008 control passes to operation 1012.

At operation 1010, the location estimator device determines whether a sum of the signal strength 116-1 and signal strength 116-3 is greater than a sum of the signal strength 116-2 and signal strength 116-4. If so, control passes to operation 1014 in which the personal device 104 is identified as being in the front passenger side of the vehicle 102. Otherwise, control passes to operation 1016 in which the personal device 104 is identified as being in the front driver side of the vehicle 102. After operation 1014 control passes to operation 1022. After operation 1016 control passes to operation 1024.

At operation 1012, the location estimator device determines whether a sum of the signal strength 116-1 and signal strength 116-3 is greater than a sum of the signal strength 116-2 and signal strength 116-4. If so, control passes to operation 1018 in which the personal device 104 is identified as being in the rear passenger side of the vehicle 102. Otherwise, control passes to operation 1020 in which the personal device 104 is identified as being in rear driver side of the vehicle 102. After operation 1018 control passes to operation 1026. After operation 1016 control passes to operation 1028.

At operation 1022, the location estimator device determines whether signal strength 116-2 is less than signal strength 116-3. If so, control passes to operation 1030 in which the personal device 104 is identified as being in the front passenger side of the vehicle 102 and also the front driver diagonal sector. Otherwise, control passes to operation 1032 in which the personal device 104 is identified as being in the front passenger side of the vehicle 102 and also the rear passenger diagonal sector. After operations 1030 and 1032 control passes to operation 1046.

At operation 1024, the location estimator device determines whether signal strength 116-1 is less than signal strength 116-4. If so, control passes to operation 1034 in which the personal device 104 is identified as being in the front driver side of the vehicle 102 and also the front passenger diagonal sector. Otherwise, control passes to operation 1036 in which the personal device 104 is identified as being in the front driver side of the vehicle 102 and also the rear driver diagonal sector. After operations 1034 and 1036 control passes to operation 1046.

At operation 1026, the location estimator device determines whether signal strength 116-1 is less than signal strength 116-4. If so, control passes to operation 1038 in which the personal device 104 is identified as being in the rear passenger side of the vehicle 102 and also the front passenger diagonal sector. Otherwise, control passes to operation 1040 in which the personal device 104 is identified as being in the rear passenger side of the vehicle 102 and also the rear driver diagonal sector. After operations 1038 and 1040 control passes to operation 1046.

At operation 1028, the location estimator device determines whether signal strength 116-2 is less than signal strength 116-3. If so, control passes to operation 1042 in which the personal device 104 is identified as being in the rear driver side of the vehicle 102 and also the front driver diagonal sector. Otherwise, control passes to operation 1044 in which the personal device 104 is identified as being in the rear driver side of the vehicle 102 and also the rear passenger diagonal sector. After operations 1042 and 1044 control passes to operation 1046.

At operation 1046, the location estimator device calculates k for the center point of the diagonal sector. In an example, the location estimator device selects a center of mass of the diagonal sector identified in operations 1030-1044, and calculates the k that minimizes equation (6) for that point. An initial value for k may be obtained by a weighted average of the individual solutions for k calculated for each in-vehicle component 106 to have the radius matching the center point of the diagonal sector. In some examples, iterations striving at minimizing equation (6) may be used to further refine the estimated location. For instance, the estimate of k at step n+1 is equal to the estimate of k at step n−f(k)/df(k), with f given by equation (6). The estimated k can then be used to determine whether the location estimated inside-the-vehicle 102 is the actual correct choice, or if, instead, the correct location is, still inside the diagonal sector, but on the outside of the vehicle 102 interior.

At operation 1048, the location estimator device determines whether the parameter k is within a range considered to be inside the vehicle 102. In an example, even if the signal strength 116 is un-calibrated, the signal strength 116 measurements may still be assumed to be inside an expected range. This range may translate into a "correct" range for the parameter k. If the estimated k falls into the expected range then control passes to operation 1050 to determine that the personal device 104 is estimated to be inside the vehicle 102. Otherwise the control passes to operation 1052 to determine that personal device 104 is either outside of the vehicle 102, or its signal strength 116 is attenuated because the personal device 104 is within a pocket or bag or other attenuated location. After operations 1050 and 1052 the process 1000 ends.

Figure 11:
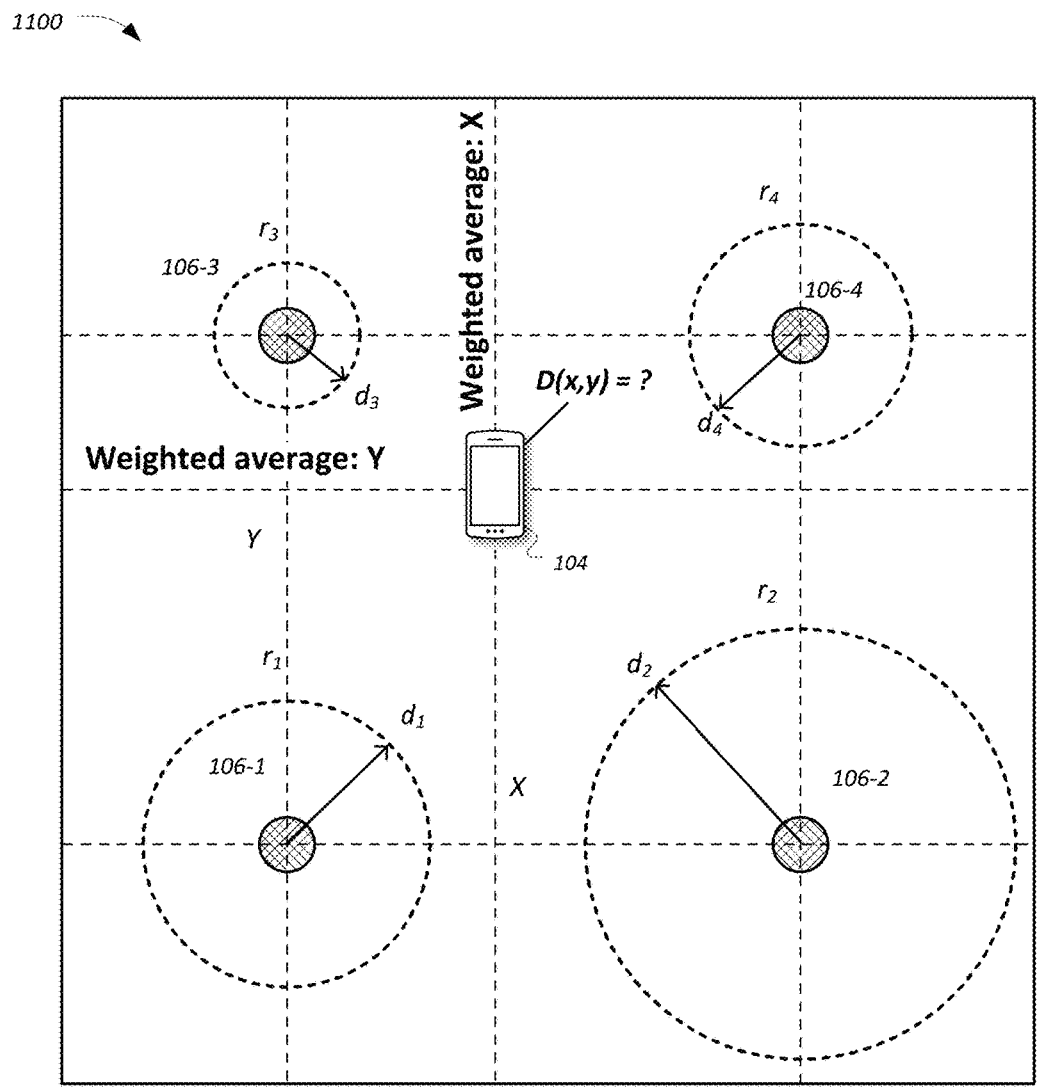
FIG. 11 illustrates an example diagram of determining a location of the personal device according to a selective weighted average of signal strength.

FIG. 11 illustrates an example diagram 1100 of determining a location of the personal device 104 according to a selective weighted average of signal strength 116. For example, an identification of the driver to passenger side of the vehicle 102 cabin with stronger signal strength 116 (i.e., shorter estimated distances d) may be identified, and a driver to passenger estimate for the y location may be determined according to a weighted average (i.e. y is closer to transmitter which has shorter estimated distance d). Additionally, an identification of the front to rear side of the vehicle 102 cabin with stronger signal strength 116 (i.e. shorter estimated distances d) may be identified, and a front to back estimate for the x location may be determined according to a weighted average (i.e. x is closer to the wireless transceiver 110 which has a shorter estimated distance d).

Figure 12:
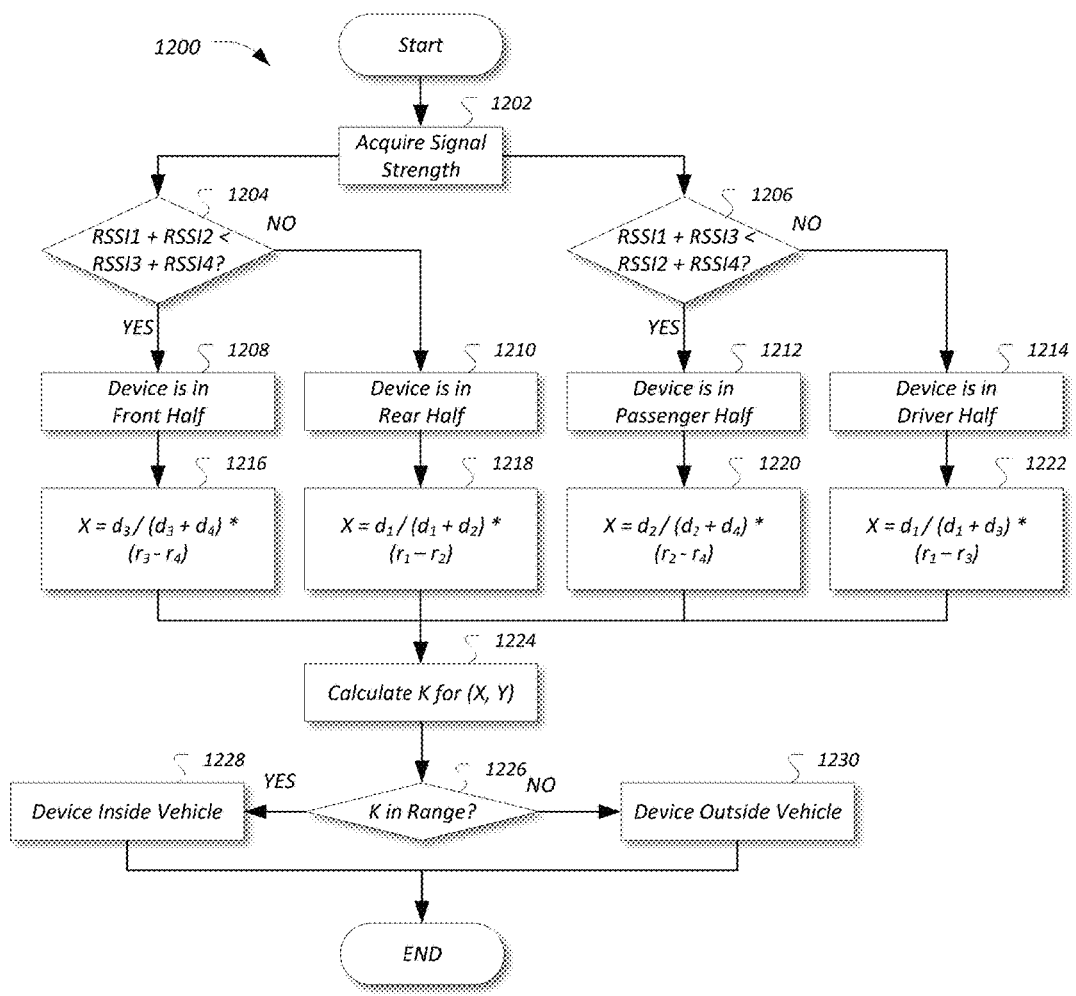
FIG. 12 illustrates an example flow diagram of the lateration process for determining the location estimate for the personal device according to a selective weighted average of signal strength.

FIG. 12 illustrates an example flow diagram of the lateration process 1200 for determining the location estimate for the personal device 104 according to a selective weighted average of signal strength 116. Similar to as discussed above with respect to the process 1000, the process 1200 may be performed by one of the in-vehicle components 106 of the vehicle 102 in communication with other in-vehicle components 106 of the vehicle 102 and/or by the personal device 104 in communication with the in-vehicle components 106 of the vehicle 102. Also similar to as discussed above with respect to the process 1000, for sake of explanation, the device performing the lateration process 1000 may be referred to as the location estimator device, and the in-vehicle components 106 may include the four in-vehicle components 106-1, 106-2, 106-3 and 106-4 located at relatively symmetrical locations within the zones 108-A, 108-B, 108-C and 108-D of the vehicle 102 and operating with similar sensitivity to one another.

At operation 1202, the location estimator device acquires signal strength 116 information. In an example, one of the in-vehicle components 106 may broadcast or otherwise send a request for signal strength 116 to the other in-vehicle components 106 of the vehicle 102. This request may cause the other in-vehicle components 106 to return wireless signal strength 116 data identified by their respective wireless transceiver 110 for the personal devices 104 that are detected. In another example, the personal device 104 acting as the location estimator device may determine the signal strength 116 of the personal device 104 to the in-vehicle components 106.

At operation 1204, the location estimator device determines whether a sum of the signal strength 116-1 and signal strength 116-2 is less than a sum of the signal strength 116-3 and signal strength 116-4. If so, control passes to operation 1208 in which the personal device 104 is identified as being in the front of the vehicle 102. Otherwise, control passes to operation 1210 in which the personal device 104 is identified as being in the rear of the vehicle 102. After operation 1208 control passes to operation 1216. After operation 1210 control passes to operation 1218.

At operation 1206, the location estimator device determines whether a sum of the signal strength 116-1 and signal strength 116-3 is less than a sum of the signal strength 116-2 and signal strength 116-4. If so, control passes to operation 1212 in which the personal device 104 is identified as being in the passenger side of the vehicle 102. Otherwise, control passes to operation 1214 in which the personal device 104 is identified as being in the driver side of the vehicle 102. After operation 1212 control passes to operation 1220. After operation 1214 control passes to operation 1222.

At operation 1216, the location estimator device computes X. In an example, X may be computed as the quantity of $d_3/(d_3+d_4)*(r_3-r_4)$, where $r_3-r_4$ is the distance of the two wireless transceivers 110 of the in-vehicle components 106-3 and 106-4, and $d_3$ and $d_4$ are the initial estimates of the un-calibrated distance from the personal device 104. After operation 1216, control passes to operation 1224.

At operation 1218, the location estimator device computes X. In an example, X may be computed as the quantity of $d_1/(d_1+d_2)*(r_1-r_2)$, where $r_1-r_2$ is the distance of the two wireless transceivers 110 of the in-vehicle components 106-1 and 106-2, and $d_1$ and $d_2$ are the initial estimates of the un-calibrated distance from the personal device 104. After operation 1218, control passes to operation 1224.

At operation 1220, the location estimator device computes X. In an example, X may be computed as the quantity of $d_2/(d_2+d_4)*(r_2-r_4)$, where $r_2-r_4$ is the distance of the two wireless transceivers 110 of the in-vehicle components 106-2 and 106-4, and $d_2$ and $d_4$ are the initial estimates of the un-calibrated distance from the personal device 104. After operation 1220, control passes to operation 1224.

At operation 1222, the location estimator device computes X. In an example, X may be computed as the quantity of $d_1/(d_1+d_3)*(r_1-r_3)$, where $r_1-r_3$ is the distance of the two wireless transceivers 110 of the in-vehicle components 106-1 and 106-3, and $d_1$ and $d_3$ are the initial estimates of the un-calibrated distance from the personal device 104. After operation 1222, control passes to operation 1224.

At operation 1224, the location estimator device calculates k for the point (X, Y), e.g., with a procedure analogous to as described above with respect to operation 1046.

At operation 1226, the location estimator device determines whether the parameter k is within a range considered to be inside the vehicle 102. In an example, even if the signal strength 116 is un-calibrated, the signal strength 116 measurements may still be assumed to be inside an expected range. This range may translate into a "correct" range for the parameter k. If the estimated k falls into the expected range then control passes to operation 1228 to determine that the personal device 104 is estimated to be inside the vehicle 102. Otherwise the control passes to operation 1230 to determine that personal device 104 is either outside of the vehicle 102, or its signal strength 116 is attenuated because the personal device 104 is within a pocket or bag or other attenuated location. After operations 1228 and 1230 the process 1200 ends.

Thus, the described lateration may allow a location estimator device to determine whether a personal device 104 is located inside or outside the vehicle 102. Using this information, connection to features inside the vehicle 102 may be enabled without the need for pairing the personal device 104, since location estimator device may have identified whether the personal device 104 is inside the vehicle 102 and authorized to utilize the in-vehicle component 106, or is outside the vehicle 102 and is not authorized to utilize the in-vehicle component 106. Additionally, the described lateration may allow a location estimator device to determine the zone 108 of the personal device 104 within the vehicle 102 to allow for the direct selection of vehicle 102 features that are directly connected to the zone 108 seating position.

Computing devices described herein, such as the personal devices 104 and in-vehicle components 106, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
first, second, third, and fourth in-vehicle components arranged symmetrically within and delimiting boundaries of a vehicle interior; and
a processor programmed to
identify signal strength information indicative of distance of a personal device from wireless transceivers of each of the in-vehicle components;
compute, using the signal strength information, a quadrant and diagonal sector including a location of the personal device, and whether the location is within the vehicle interior;
compare a sum of signal strength information from the first in-vehicle component and the second in-vehicle component to a sum of signal strength information from the third in-vehicle component and the fourth in-vehicle component to determine an indication whether the personal device is within a front half or a rear half of the vehicle;
compare a sum of signal strength information from the first in-vehicle component and the third in-vehicle component to a sum of signal strength information from the second in-vehicle component and the fourth in-vehicle component to determine an indication of whether the personal device is within a driver half or a passenger half of the vehicle;
identify the quadrant based on the indication of whether the personal device is within the front half or the rear half of the vehicle and the indication of whether the personal device is within the driver half or the passenger half of the vehicle; and authorize the personal device located in the quadrant to wirelessly access features of the in-vehicle component located in the quadrant, wherein the quadrant is one of: a rear driver-side seating position quadrant in which the first in-vehicle component is located, a rear passenger-side seating position quadrant in which the second in-vehicle component is located, a front driver-side seating position quadrant in which the third in-vehicle component is located, and a front passenger-side seating position quadrant in which the fourth in-vehicle component is located.

2. The system of claim 1, wherein the processor is further programmed to compare the signal strength information to a constant k to determine whether the location is within the vehicle interior.

3. The system of claim 1, wherein the processor is further programmed to prevent the personal device from wirelessly accessing features of the in-vehicle component when the location is determined to be outside the vehicle interior.

4. The system of claim 1, wherein each of the first, second, third, and fourth in-vehicle components is associated with a respective seating position of the vehicle.

5. A system comprising:
first, second, third, and fourth in-vehicle components arranged symmetrically within and delimiting boundaries of a vehicle interior; and
a processor programmed to
identify signal strength information indicative of distance of a personal device from wireless transceivers of each of the in-vehicle components;
compute, using the signal strength information, a quadrant and diagonal sector including a location of the personal device, and whether the location is within the vehicle interior, wherein the quadrant is one of a rear driver-side seating position quadrant in which the first in-vehicle component is located, a rear passenger-side seating position quadrant in which the second in-vehicle component is located, a front driver-side seating position quadrant in which the third in-vehicle component is located, and a front passenger-side seating position quadrant in which the fourth in-vehicle component is located;
compare a sum of signal strength information from the first in-vehicle component and the second in-vehicle component to a sum of signal strength information from the third in-vehicle component and the fourth in-vehicle component to determine an indication whether the personal device is within a front half or a rear half of the vehicle;
compare a sum of signal strength information from the first in-vehicle component and the third in-vehicle component to a sum of signal strength information from the second in-vehicle component and the fourth in-vehicle component to determine an indication of whether the personal device is within a driver half or a passenger half of the vehicle;
identify the quadrant based on the indication of whether the personal device is within the front half or the rear half of the vehicle and the indication of whether the personal device is within the driver half or the passenger half of the vehicle;
when the quadrant is the front passenger-side seating position quadrant or the rear driver-side seating position quadrant, determine the diagonal sector by comparing the signal strength information from the second in-vehicle component to the signal strength information from the third in-vehicle component;
when the quadrant is the front driver-side seating position quadrant or the rear passenger-side seating position quadrant, determine the diagonal sector by comparing the signal strength information from the first in-vehicle component to the signal strength information from the fourth in-vehicle component; and
authorize the personal device located in the quadrant to wirelessly access features of the in-vehicle component located in the quadrant.

6. The system of claim 1, wherein one of: the first, second, third, and fourth in-vehicle components are reading lights and the first, second, third, and fourth in-vehicle components are speakers.

7. The system of claim 1, wherein the personal device is a smartphone.

8. A method comprising:
identifying a quadrant of a vehicle divided into first and second dimensions that includes a location of a personal device by comparing signal strength information of pairs of wireless transceivers in adjacent quadrants to signal strength information of wireless transceivers opposite the pairs, the wireless transceivers being included within first, second, third, and fourth in-vehicle components arranged symmetrically within and delimiting boundaries of an interior of the vehicle;
determining a diagonal sector including the location by comparing the signal strength information from quadrants adjacent to the quadrant in the first and the second dimensions;
locating the personal device as within an intersection of the quadrant and diagonal;
comparing a sum of signal strength information from the first in-vehicle component and the second in-vehicle component to a sum of signal strength information from the third in-vehicle component and the fourth in-vehicle component to determine an indication whether the personal device is within a front half or a rear half of the vehicle;
comparing a sum of signal strength information from the first in-vehicle component and the third in-vehicle component to a sum of signal strength information from the second in-vehicle component and the fourth in-vehicle component to determine an indication of whether the personal device is within a driver half or a passenger half of the vehicle;
identifying the quadrant based on the indication of whether the personal device is within the front half or the rear half of the vehicle and the indication of whether the personal device is within the driver half or the passenger half of the vehicle,
when the quadrant is the front passenger-side seating position quadrant or the rear driver-side seating position quadrant, determining the diagonal sector by comparing the signal strength information from the second in-vehicle component to the signal strength information from the third in-vehicle component;
when the quadrant is the front driver-side seating position quadrant or the rear passenger-side seating position quadrant, determining the diagonal sector by comparing the signal strength information from the first in-vehicle component to the signal strength information from the fourth in-vehicle component;
preventing the personal device from wirelessly accessing features of the vehicle when the location is determined to be outside the vehicle; and authorizing the personal device to wirelessly access features of in-vehicle components located within the quadrant when the location is determined to be inside the vehicle.

9. The method of claim 8, further comprising comparing the signal strength information to a constant k to determine whether the location is inside or outside an area bounded by the wireless transceivers.

10. The method of claim 8, further comprising receiving the signal strength information from a first of the wireless transceivers located in a rear driver-side seating position quadrant; a second of the wireless transceivers located in a rear passenger-side seating position quadrant; a third of the wireless transceivers located in a front driver-side seating position quadrant; and a fourth of the wireless transceivers located in a front passenger-side seating position quadrant.

11. The method of claim 8, wherein the signal strength information includes received signal strength indication (RSSI) information received over Bluetooth Low-Energy (BLE) protocol wireless connections.

12. A system comprising:
a personal device including
a wireless transceiver; and
a processor programmed to
identify signal strength information indicative of distance of the personal device from wireless transceivers of each of first, second, third, and fourth in-vehicle components arranged symmetrically within and delimiting boundaries of a vehicle interior; and
compute, using the signal strength information, a quadrant and diagonal sector including a location of the personal device;
locate the personal device as within an intersection of the quadrant and diagonal;
compare a sum of signal strength information from the first in-vehicle component and the second in-vehicle component to a sum of signal strength information from the third in-vehicle component and the fourth in-vehicle component to determine an indication whether the personal device is within a front half or a rear half of the vehicle;
compare a sum of signal strength information from the first in-vehicle component and the third in-vehicle component to a sum of signal strength information from the second in-vehicle component and the fourth in-vehicle component to determine an indication of whether the personal device is within a driver half or a passenger half of the vehicle;
identify the quadrant based on the indication of whether the personal device is within the front half or the rear half of the vehicle and the indication of whether the personal device is within the driver half or the passenger half of the vehicle,
when the quadrant is the front passenger-side seating position quadrant or the rear driver-side seating position quadrant, determine the diagonal sector by comparing the signal strength information from the second in-vehicle component to the signal strength information from the third in-vehicle component;
when the quadrant is the front driver-side seating position quadrant or the rear passenger-side seating position quadrant, determine the diagonal sector by comparing the signal strength information from the first in-vehicle component to the signal strength information from the fourth in-vehicle component; and
authorize the personal device located in the quadrant to wirelessly access features of the in-vehicle component located in the quadrant.

13. The system of claim 12, wherein the processor is further programmed to compare the signal strength information to a constant k to determine whether the location is inside or outside the vehicle interior.

14. The system of claim 12, wherein the quadrant is one of: a rear driver-side seating position quadrant in which the first in-vehicle component is located, a rear passenger-side seating position quadrant in which the second in-vehicle component is located, a front driver-side seating position quadrant in which the third in-vehicle component is located, and a front passenger-side seating position quadrant in which the fourth in-vehicle component is located.

15. The system of claim 14, wherein each of the first, second, third, and fourth in-vehicle components is associated with a respective seating position of the vehicle.

* * * * *